(12) United States Patent
Dintenfass et al.

(10) Patent No.: US 11,615,405 B2
(45) Date of Patent: *Mar. 28, 2023

(54) SYSTEM FOR SECURE DISTRIBUTION OF PEER REQUESTS FOR RESOURCES

(71) Applicant: Bank of America Corporation, Charlotte, NC (US)

(72) Inventors: Katherine Dintenfass, Lincoln, RI (US); Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,181

(22) Filed: May 18, 2022

(65) Prior Publication Data

US 2022/0277296 A1 Sep. 1, 2022

Related U.S. Application Data

(63) Continuation of application No. 16/593,311, filed on Oct. 4, 2019, now Pat. No. 11,367,067.

(51) Int. Cl.
*G06Q 20/36* (2012.01)
*G06F 21/32* (2013.01)
(Continued)

(52) U.S. Cl.
CPC ......... *G06Q 20/3674* (2013.01); *G06F 21/32* (2013.01); *G06F 21/629* (2013.01);
(Continued)

(58) Field of Classification Search
None
See application file for complete search history.

(56) References Cited

U.S. PATENT DOCUMENTS 6,934,689 B1 8/2005 Ritter et al.
8,296,227 B2 10/2012 Galit et al.
(Continued)

OTHER PUBLICATIONS

Brian X. Chen, "Hacker Resolves iPhone Screenshot Security Issue," https://www.wired.com/2008/09/hacker-describe/, Sep. 22, 2008.

(Continued)

*Primary Examiner* — Narayanswamy Subramanian
(74) *Attorney, Agent, or Firm* — Weiss & Arons LLP

(57) ABSTRACT

Aspects of the disclosure relate to a system that provides enhanced security of information transmitted by connected devices. The system may be used to request resources from members of a donee's virtual group. Donated funds or line of credit may be loaded to the donee's digital wallet with no link to any of the donee's personal accounts. The request for resources may utilize secure correspondence between the donee and the prospective donors. The secure correspondence may be locked and prevented from being forwarded or captured via a screenshot to ensure confidentiality. If an attempt is made to forward or copy the secure correspondence, the secure correspondence may be deleted. Donated funds/line of credit may be allocated for specific use, and may not be owned by the donee until used.

10 Claims, 7 Drawing Sheets

(51) Int. Cl.
  *G06F 21/62* (2013.01)
  *G06Q 20/40* (2012.01)
  *H04W 12/63* (2021.01)
  *H04W 12/106* (2021.01)

(52) U.S. Cl.
  CPC ..... *G06Q 20/367* (2013.01); *G06Q 20/40145* (2013.01); *H04W 12/106* (2021.01); *H04W 12/63* (2021.01); *G06F 2221/2137* (2013.01); *G06F 2221/2143* (2013.01)

(56) References Cited

U.S. PATENT DOCUMENTS

| | | | |
|---|---|---|---|
| 8,346,659 B1 | 1/2013 | Mohsenzadeh | |
| 8,548,821 B2 | 10/2013 | Sheperd | |
| 8,676,155 B2* | 3/2014 | Fan | H04W 4/14 370/428 |
| 8,706,809 B2 | 4/2014 | D'Amore et al. | |
| 8,898,081 B2 | 11/2014 | Lilly et al. | |
| 9,179,274 B2 | 11/2015 | Lisbey et al. | |
| 9,280,771 B2 | 3/2016 | Barillaud et al. | |
| 10,210,345 B2 | 2/2019 | Beye et al. | |
| 10,984,411 B1 | 4/2021 | Hayes et al. | |
| 11,463,576 B1* | 10/2022 | Gordon | H04M 1/72448 |
| 2003/0233410 A1* | 12/2003 | Gusler | G06Q 10/107 709/206 |
| 2007/0057038 A1 | 3/2007 | Gannon | |
| 2007/0255653 A1 | 11/2007 | Tumminaro et al. | |
| 2007/0265957 A1 | 11/2007 | Advani et al. | |
| 2013/0203345 A1* | 8/2013 | Fisher | G06Q 20/322 455/41.1 |
| 2013/0226688 A1 | 8/2013 | Harvilicz et al. | |
| 2014/0012780 A1 | 1/2014 | Sanders | |
| 2014/0032310 A1 | 1/2014 | Corrie et al. | |
| 2017/0124604 A1 | 5/2017 | Hill | |

OTHER PUBLICATIONS

"Prevent Copying Text in Web-Page," https://stackoverflow.com/questions/8957443/prevent-copying-text-in-web-page, Jan. 21, 2012.
"WP Content Copy Protection," https://www.manjemedia.com/7-ways-to-copy-content-from-a-website-with-disabled-text-selection-and-right-clicking/, Manje Media, Jun. 18, 2015.

* cited by examiner

SYSTEM FOR SECURE DISTRIBUTION OF PEER REQUESTS FOR RESOURCES

CROSS REFERENCE TO RELATED APPLICATION

This application is a continuation of U.S. patent application Ser. No. 16/593,311 filed on Oct. 4, 2019, which is hereby incorporated by reference herein in its entirety.

FIELD OF TECHNOLOGY

Aspects of the disclosure relate to a system that provides enhanced security of information routed between mobile devices. Specifically, the system prevents a target mobile device from accessing information circulated by a source mobile device.

BACKGROUND

Mobile devices are used for a variety of purposes, including social and work-related tasks. For example, mobile devices are used for communication among friends. Friends that live geographically apart and may not otherwise be able to regularly speak or see each other may now be in regular contact using their mobile devices.

For example, friends may form group chats or other virtual groups. Within these virtual groups, friends may communicate and update each other on life events. Using their mobile devices, friends can easily share career accomplishments, life challenges, or appeal to others within their virtual group for advice or other assistance.

Because friends may now be in regular contact with each other, an appeal for help by one friend may be viewed with creditability by others in the virtual group. In response to the appeal for help, members of the virtual group may take action to provide the requested assistance. For example, based on prior or ongoing communications, friends may be aware that a member of their virtual group is in need of financial assistance. A request for help may be supported by shared communications that reflect lifestyle changes or provide contextual clues. Exemplary lifestyle changes may include moving to reduce housing costs or looking for a new job. Contextual clues may include comments or posted pictures that indicate a change in spending habits or use of charitable services.

Friends may be more aware of each other's struggles and may be more motivated to lend assistance because a request for help with those struggles may be associated with observable communications. However, the friend in need may not feel comfortable requesting help. Mobile devices now make it easier information with people outside the virtual group. Although friends may be more willing to lend assistance, the struggling friend may be reluctant to ask for help because of a possibility that their struggle or situation may be publicized outside the virtual group.

Accordingly, it would be desirable to provide a system that allows friends to securely communicate with each other and prevents the information communicated among members of a virtual group from being circulated to members outside the group. Such a system may have broader applications in other areas where information needs to be securely communicated among members of a group. Members of the group may wish to use publicly available communication networks and equipment to efficiently communicate. However, members of the group may also wish to restrict group members from forwarding or otherwise providing non-group members with access to inter-group communications.

Accordingly, it would be desirable to provide a SYSTEM FOR SECURE DISTRIBUTION OF PEER REQUESTS FOR RESOURCES.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
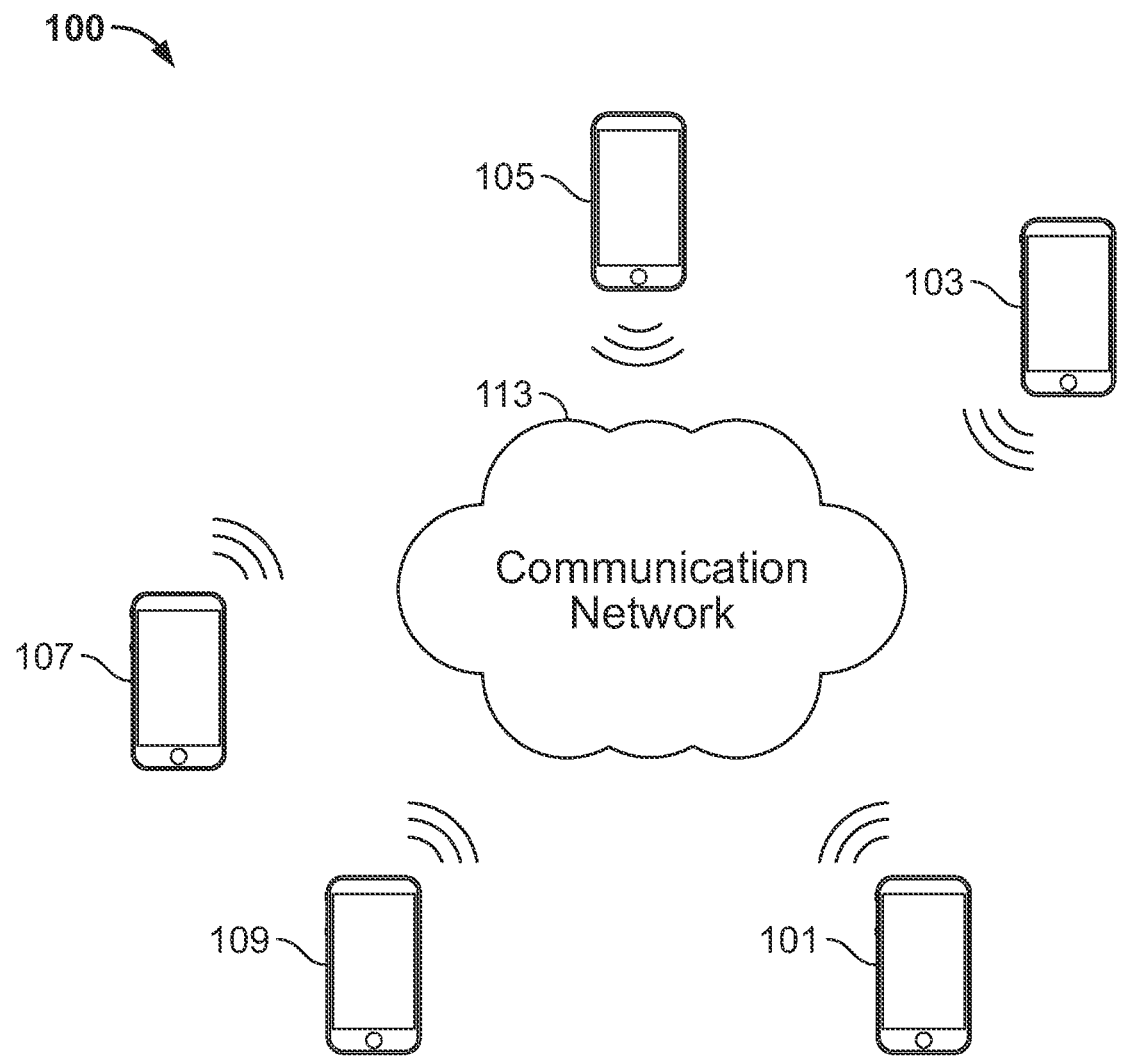
FIG. 1 shows an illustrative system in accordance with principles of the disclosure.

A system for improving security of information transmitted between computer and digital processing devices is provided. The system may secure information routed between connected mobile devices. The information may be carried by any suitable communication network. Illustrative communication networks may include the internet, cellular networks and satellite communication networks.

The system may provide secure messaging capabilities between connected devices. For example, the system may allow a donee to securely request resources from a donor. The system may allow a donor to securely communicate with a donee. The donor may securely provide resources requested by the donee. Thus, the system may provide a platform for donee and donor exchange of messages.

The system may include a source mobile device. The source mobile device may be configured to transmit and receive information from a donee. The system may include a destination mobile device. The destination mobile device may be configured to transmit and receive data from a donor. The system may include an excluded mobile device.

The system may include a secure application. The secure application may be a standalone application. The secure application may be an online baking application. The source device may run an instance of the secure application. The source device may use the secure application to formulate the message. The destination device may run an instance of the secure application. The destination device may use the secure application to view the message. The destination device may use the secure application to respond to the message.

The excluded device may run an instance of the secure application. The excluded device may use the secure application to formulate a request. The excluded device may use the secure application to conduct online banking tasks.

The secure application may be used by the donee to formulate a message. The message may be a text message, an audio message, multimedia message or any suitable message. The secure application may be configured to lock the message. Locking the lock the message may prevent the destination device from transmitting the message to the excluded mobile device.

For example, the secure application may allow the donee to specify an identifier associated with a mobile device. The sender may affirmatively specify one or more identifiers associated with one or more desired destination devices.

The secure application may be configured to limit transmission of the message from the source device to the destination devices. An instance of the secure application running on the destination devices may prevent the target destination devices from forwarding the message to an excluded device or capturing a screenshot of the received message.

In some embodiments, the donee may specify one or more identifiers associated with one or more excluded devices. The source device may then transmit the message to desired destination devices. The secure application running on the destination devices may allow the received message to be freely transmitted to any other connected device except for the one or more excluded devices.

In some embodiments, when the source device specifies one or more excluded devices, a destination device may share the message with other connected devices unless the other connected devices have been specified as an excluded device. The message may be shared with friends, and friends may share with other trusted friends.

The secure application may be configured to prevent the message from being shared using any other application aside from the secure application. The secure application may prevent a destination device from capturing a screen shot of the message.

A destination device that receives a locked message may attempt to send the message to the excluded device by addressing the message to the excluded device using one or more of the identifiers associated with the excluded device.

Illustrative identifiers (for specifying destination or excluded devices) may include a phone number, email address, bank account number or other identifier associated with a connected device. A connected device may be identified based on a media access control ("MAC") address, international mobile equipment identity ("IMEI") or mobile equipment identifier ("MEID") associated with the connected device.

The secure application may be configured to check addressee identifier and determine whether the identifier is associated with an excluded device. The secure application may communicate with a remote server to evaluate the entered identifier. The remote server may store identifiers associated with excluded devices. The secure application may submit a query to the remote server asking whether an identifier specified in a message is associated with an excluded device. The remote server may respond to the query indicating whether the message may be transmitted or not.

In some embodiments, an identifier that is not included in a list of destination devices may be considered to be associated with an excluded device. In some embodiments, if the secure application cannot determine whether an identifier is associated with an excluded device, the secure application may prevent transmission of the message.

An identifier may be evaluated in real time. The secure application may prevent transmission of the message until the identifier is evaluated. The secure application may be configured to determine whether an identifier is associated with any of two or more excluded devices.

In some embodiments, the secure application may itself include computer code for evaluating an identifier. The secure application may store, locally in a secure memory location, one or more identifiers associated with excluded devices. Identifiers associated with excluded devices stored locally on a device may be encrypted.

The secure application may interact with third party applications using an application program interface ("API"). The third party applications may include messaging applications, social media applications, financial applications or any suitable application. An API may provide a conduit for inter-application communication. The secure application may formulate requests for information in accordance with an API for a given application. The secure application may receive responses to the requests for information from the third party applications. Responses received from the third party applications may include alerts, messages or triggers.

The secure application may submit a query to a third party application using an API for communicating with the third party application. An illustrative query may ask whether an identifier associated with an excluded device is included in a list of participants in a virtual group. If the third party application flags an identifier of an excluded device as being a member of a virtual group, the secure application may prevent the message from being shared with any member of the virtual group.

The secure application running on the donee's mobile device may ensure that correspondence between the donee and prospective donors cannot be forwarded, screenshot or otherwise copied to ensure confidentiality. The secure application may be configured to disable the destination mobile device from copying the message.

Copying may be disabled by presenting text on a destination device as a photo. Copying may be prevented by disabling an ability of a destination device to select text displayed on a screen. A device-user may be prevented from selected text by hiding display of a cursor when the locked message is being viewed. Copying may be prevented by disabling "right click" functionality of a mouse or other pointer device. Copying may be prevented by disabling touch functionality when a device-user holds a finger against a touch screen (e.g., "long press").

For example, when a user of a destination device holds a finger against a touch screen of a mouse or other pointer device, no menu options for copying or selecting displayed information may be displayed to the user.

The secure application may disable a capability of a destination mobile device to capture a screenshot of the locked message. The secure application may disable an ability of any information included in the locked message to be captured via a screenshot. In some embodiments, the secure application may disable capturing any screenshots when the locked message is presented by the secure application.

The ability of the destination device to capture screenshots when using the secure application may be toggled to "on" after the destination device responds to the message. The secure application may be configured to delete the message after the destination responds to the message. The secure application may be configured to delete the message messages after a predetermined time period. The secure application may be configured to delete the message messages a predetermined time period after receiving the message. The secure application may inform the donee that the message has been deleted.

When a secure message is received at a destination device, the secure application may be configured to prompt the destination mobile device to formulate a response to the message. The secure application may impose the same restrictions on a response as were applied by the donee to the message received by the destination device. For example, the secure application may prevent the destination device from transmitting a response to an excluded mobile device specified by the donee. The secure application may prevent the destination device from transmitting the response to any other application.

The secure application may inform the donee that a destination device has attempted to forward or capture a copy of the message to an excluded device or unauthorized application. In some embodiments, when the destination device attempts an unauthorized forward or capture a copy of the message, the secure application may add an identifier associated with the destination device as an excluded device.

In some embodiments, the secure application may be configured to retransmit the message to the destination device. For example, the secure application may be configured to retransmit a message when a response to the message is not received from a destination device after expiration of a predetermined time period.

The secure application may be further configured to route a response to the message from a donor over the network to an intermediary computer system. The intermediary computer system may be configured to reformulate the response from the donor as an input to a digital wallet application running on the source mobile device. An instance of the secure application running on the source mobile device may be configured to receive the input from the intermediary computer system and integrate the input into the digital wallet application. In some embodiments, the intermediary computer system may interact directly with the digital wallet application.

The intermediary computer system may be associated with a financial institution. The message from a donee may include a request for funds or a line-of-credit. The donee request may be a charitable request to help a friend in need. A donor may receive the request via a destination device and formulate a response acceding to the request. For example, the donor response may include authorization for the financial institution to provide the donee with a certain amount of funds. The donor response may agree to assume responsibility for credit extended by the financial institution to the donee.

The financial institution may provide funds and/or credit to the donee by making the funds/credit available to donee in a digital wallet application running on the source device. For example, the secure application may be configured to populate a digital wallet application running on the source mobile device with a payment option corresponding to a donor response. The intermediary computer system may load the payment option with donated funds and/or credit specified in the donor response.

The system may provide a platform for allowing a friend-in-need (e.g., a donee) to reach to their circle of friends (e.g., donors) and request financial assistance. For example, the donee may "crowdfund" among their circle of friends. The donee may be in possession of the source device and their friends in possession of destination devices. Devices that belong to people outside the circle of friends may be classified as excluded devices.

In some embodiments, a destination device may share the request with another circle of friends. Friends may share with friends, and friends sharing with other trusted friends with some excluded devices being blocked.

The system may load donated funds or line of credit into a digital wallet running on the source device. The funds or line-of-credit may not be linked to any of the donee's personal accounts. The funds or line-of-credit may be administered by a financial institution that maintains the donee's bank accounts. The funds or line-of-credit may be administered by a financial institution collectively selected by the circle of friends that contribute to the funds or line-of-credit to the donee.

The funds/credit donated to the donee may be allocated by a donor for specific use. Donated funds/credit may not be "owned" by the donee until used. For example, donated funds/credit may not appear in the donee's bank account or increase the amount of available credit for the donee's credit cards.

Donated funds/credit may be administered and disbursed by a financial institution. The financial institution may use the donated funds/credit to reduce an amount charged to the donee by a merchant. The reduction may be applied at a POS terminal of the merchant. The financial institution may directly transfer donated funds/credit to the merchant without the donated funds/credit passing through any accounts of the donee.

In some embodiments, disbursement of the donated funds/credit may be controlled by the donee. The donee may decide when to use the donated funds/credit.

In some embodiments, when the donated funds/credit is used to pay for a purchase, a flag may be applied to the purchase. The flag may indicate that the purchase was made by a donee using donated funds/credit. A purchase using the donated funds/credit may be processed differently than a typical purchase. For example, such a purchase may be immunized from processing charges associated with using the donee's personal funds/credit for the purchase.

In some embodiments, the donee may use the secure application to generate a link. The link may be circulated using third party applications. The link may be circulated using the secure application. The link may provide access to a webpage. The webpage may be hosted on a remote server. The webpage may be hosted on the source device. The webpage may allow donors to donate resources to the donee. The webpage may explain why the donee is in need of resources.

Access to the webpage may be restricted. For example, although the link may be freely circulated across different applications, an excluded device may not be allowed to access the webpage. The device or system hosting the webpage may be configured to determine whether a connected device attempting to access the webpage is authorized to do so.

In response to detecting an attempt by an unauthorized device to access the webpage, the device or system hosting the webpage may trigger an alert. The alert may be transmitted to the source device. The alert may inform the donee that an excluded device has attempted to access the webpage.

An alert may be transmitted to a destination device. An alert may inform a destination device that it has forwarded the link to an unauthorized device. An alert may be transmitted to an excluded device. The alert may inform the excluded device that access to the webpage is restricted. Devices authorized to access the webpage may be verified using any suitable device identifier. Illustrative device identifiers may include a phone number, email address, bank account number, a user name, email address, mobile phone number, MAC address, IMEI or MEID.

Via an API, an alert may be generated by a third party application each time the link is forwarded to a connected device. In some embodiments, an alert may be triggered when the link is forward to a target device. The target device may be any suitable connected device such as a destination device or an excluded device.

In some embodiments, the system may include machine learning and artificial intelligence algorithms. For example, an alert may be triggered each time a link (or donee message) is forwarded. The alerts may identify a location of a connected device that forwarded the link. The alerts may identify a location of a connected device that attempts to access the webpage.

Location of a connected device may be determined by a location sensor in the connected device. Illustrative location sensors may include a sensor that utilizes a global positioning system ("GPS"). Location may be determined by an Internet Protocol ("IP") address accessed by the connected device.

Based on the locations, the machine learning and artificial intelligence algorithms of the system may generate a circulation flow for the link. Based on the circulation flow, the algorithms may identify connected devices that should or should not receive access to the webpage via the link.

For example, an excluded device may be associated with a geographic identifier such an area code. The algorithms may limit access to the webpage when access is requested by a device associated with the geographic identifier. A connected device may be associated with the geographic identifier because it is accessing the webpage from an IP address within a predetermined range of a location corresponding to a target geographic identifier.

Based on the circulation flow, the algorithms may identify additional connected devices for receiving the message or link. For example, the algorithms may submit one or more API requests to a plurality of third party applications to identify a target geographic area that is likely to include a threshold number of authorized destination devices. The algorithms may submit one or more API requests to a plurality of third party applications to identify a target geographic area that is unlikely to include an excluded device.

The system may identify one or more interests associated with the donee. For example, the donee may authorize the system to access information associated with one or more third party applications. Such third party applications may include social networking applications or email applications.

Based on the accessed information the system may attempt to independently corroborate a request submitted by a donee. Based on analysis of the accessed information, the system may assign a corroboration score to a donee request. The system may update the webpage and inform donors of the corroboration score.

Certain embodiments may involve sentiment analysis. Sentiment analysis, as explained below, may be used to restrict access to a webpage. Sentiment analysis may be used to remove a link from circulation. Sentiment analysis may be used to increase circulation of a link. Sentiment analysis may be used to calculate a corroboration score for a request.

Sentiment analysis is the process of computationally identifying and categorizing opinions expressed in a piece of data. In one implementation, the system may perform a sentiment analysis on a donee request by combining the information in the donee request with public data to infer a sentiment. Such public data may reflect environmental information, social media, local area news, weather, or any other suitable public information. The sentiment analysis may be used to corroborate the request. The sentiment analysis may combine private data and public data to detect otherwise hard to detect patterns.

In an exemplary sentiment analysis, the system detects that a train ticket has been purchased from a transportation ticketing entity in the state of Florida. The ticket may have been purchased using a secure application, such as an online banking application. The purchase of the train ticket may be private data.

In the same, or similar, timeframe, weather reports may have placed residents in the state of Florida on high alert of an upcoming hurricane in the same, or a similar location. Social media may be trending with news and revealing that the public is highly concerned regarding the impending weather. In such a scenario, the sentiment analysis may confirm the train ticket was purchased to flee forecasted hazardous weather. Accordingly, public and private information has been leveraged to make a determination regarding sentiment.

A donee request may seek financial assistance based on an event. The donee request itself may be private data. The event referenced in the request may be verified using public data. For example, the request for financial assistance may be based on publically accessible legal proceedings or weather events. Analysis of the public data may corroborate the request by affirmatively identifying the legal proceedings or weather event.

Apparatus for a computer and digital processing system is provided. The system may control operation of a digital wallet application. The system may include a secure messaging application. The secure messaging application may be run on a source mobile device. The secure messaging application may be configured to formulate a request for funds. The messaging application may formulate a request for funds to be made accessible via the source mobile device.

The secure messaging application may lock the request such that the request cannot be retransmitted to any device other than a specified destination mobile device. The destination device may be identified by the source device using any suitable identifier. Exemplary identifiers may include a phone number, email address, bank account number, a user name, email address, mobile phone number, MAC address, IMEI or MEID. The secure application may be configured to transmit the request to the destination mobile device.

The system may include a digital wallet application. The digital wallet application may run on the source device. Funds may be provided to the digital wallet application. The destination device may respond to the request by authorizing a transfer of funds to the digital wallet running on the source device.

The digital wallet application may be configured to store an amount of funds associated with the request and initiate a transfer of the funds. The system may include a secure chipset in the source device. The secure chipset may store the donated funds locally on the source device. The secure chipset may store encrypted keys needed to access the donated funds. The secure chipset may restrict a transfer of the donated funds by the digital wallet to a target merchant.

The digital wallet application may be configured such that the amount of funds associated with the request is not visible in the digital wallet application when the source mobile device is unlocked using a password. When the source device is unlocked using a password, a payment option stored in the digital wallet that provides access to donated funds may also be hidden. Hiding the payment option or funds may prevent other users trusted with the password of the source device from accessing funds associated with the payment option. The digital wallet may be configured to hide the amount of funds associated with the request based on any suitable criteria specified by a donor and/or donee.

The payment option and associated funds may be visible in the digital wallet application when the source mobile device is unlocked using a biometric feature. When the source device is unlocked using a biometric feature, the source device is likely in physical possession of an intended donee of the funds provided by the donors.

In some embodiments, a donee may utilize authentication credentials to access a digital wallet application running on a third-party device. Illustrative authentication credentials may include a password, biometric feature or a question only the donee knows the answer to. By entering donee authentication credentials on any connected device, a donee may access to a digital wallet application and funds or credit provided by donors.

In some embodiments, a trusted third-party may have authentication credentials that may be used to unlock a wallet application using any connected device. The trusted third-party may unlock a digital wallet application and, on behalf of a donee, access funds/credit provided donors. In some embodiments, after a digital wallet application is unlocked by a trusted third-party, the donee may still be required to input their own authentication credentials to access donor funds/credit.

The digital wallet application may be configured to hide the amount of funds associated with the request when the source mobile device is within a predetermined distance of an excluded mobile device. The secure application may be configured to detect a presence of the excluded device based on a signal emitted by the excluded device. The emitted signal may include an identifier flagged as being associated with the excluded device. The identifier may include a user name, email address, mobile phone number, MAC address, IMEI, MEID or any suitable identifier.

The presence of the excluded device may be detected by an access point used by the excluded device to access to a communication network. For example, the excluded device may access the communication network using an instance of the secure application installed on the excluded device. The secure application may be authorized to track a location of an access point used by the excluded device to access the network.

The destination mobile device may be one of a plurality of destination mobile devices. The system may include an intermediary computer system. The intermediary system may be configured to receive funds earmarked for the source mobile device and an associated donee. The earmarked funds may be received from donors via the plurality of destination mobile devices. The secure application may channel communication by the destination device regarding the request to the intermediary system. The intermediary system may flag funds received from donors in response to the request as earmarked for the source mobile device.

The intermediary system may receive funds from a plurality of donors via multiple destination mobile devices. For example, the source mobile device may be configured to distribute a message including a request for funds/credit to the plurality of destination devices. Each of the destination devices may authorize a transfer of funds or credit to the source device on behalf of the donee. The authorization may be communicated by a destination device to the intermediary system.

Based on authorizations received from the destination devices, the intermediary system may allocate amounts of funds/credit to a digital wallet application running on the source device.

The intermediary system may not allocate the maximum amount of funds/credit authorized by the destination devices to the digital wallet application. For example, the destination devices may collectively authorize a transfer of $1,500. The intermediary system may initially allocate $100 to the digital wallet application running on the source device.

The intermediary system may restrict use of the allocated amount. For example, the intermediary system may limit use of the allocated amount to specific products or services. Illustrative restrictions may include limiting use of donated funds/credit for purchasing grocery items, basic household goods, baby care products or any other suitable category of goods/services.

The digital wallet application may enforce donor restrictions by restricting purchases using the allocated funds/credit to a target merchant. The digital wallet application may identify a target merchant based on a merchant category code ("MCC") assigned to the merchant.

A MCC may be assigned based on products sold by the merchant. A MCC may classify a merchant based on a primary line of business conducted by the merchant. For example, the merchant may be assigned a MCC based on whether the merchant provides predominately goods or provides predominately services. If a merchant provides both goods and services, the MCC assigned to the merchant may correspond to the greater portion of the merchant's business.

A merchant may be assigned multiple MCCs. For example, the merchant may provide pharmacy products and grocery products. The pharmacy products may be assigned a first MCC and the grocery products may be assigned a second MCC. The MCC may classify the merchant based on a market segment serviced by the merchant. Exemplary MCCs and associated market segments are shown below in Table 1.

TABLE 1

Illustrative MCCs and associated market segments.

| Illustrative Merchant Category Code ("MCC") | Illustrative Associated Market Segment |
| --- | --- |
| 0742 | Veterinary Services |
| 4214 | Motor Freight Carriers and Trucking - Local and Long Distance, Moving and Storage Companies, and Local Delivery Services |
| 4812 | Telecommunication Equipment and Telephone Sales |
| 5047 | Medical, Dental, Ophthalmic, and Hospital Equipment and Supplies |
| 5172 | Petroleum and Petroleum Products |
| 5718 | Fireplace, Fireplace Screens, and Accessories Stores |

The digital wallet may enforce the restrictions based on a description of a product(s) scanned by a point-of-sale ("POS") terminal.

The intermediary system may be configured to monitor spending of the allocated amount using the digital wallet application. The intermediary system may be configured to replenish the amount of funds/credit when the donated amount allocated to the digital wallet application falls below a threshold amount. The threshold amount may be set by the intermediary computer system. The threshold amount may be set based on instructions from the donors.

The digital wallet application may be operational with a plurality of payment instruments. In response to receiving the request for funds, the intermediary computer system may be configured to link donated funds earmarked for the source device with at least one of the plurality of payment instruments. Linking the funds with a payment instrument already stored in the digital wallet may avoid the need to issue a new payment option to the digital wallet. When donated funds are liked to a preexisting payment instrument, when the preexisting payment instrument is used, the donated funds may be made available to the donee.

In some embodiments, a percentage of donated funds/credit provided by the destination devices and earmarked for the source device may be used to offset a purchase amount when the linked payment instrument is used as payment for the purchase. The percentage of donated funds/credit may not be shown on a regular billing statement issued for the linked payment instrument. The percentage of donated funds/credit may be included in a special billing statement issued exclusively to the source device or the donee associated with the source device. The percentage of donated funds/credit used when making the purchase may be included in a special billing statement issued exclusively to the destination devices or donors associated with the destination devices.

Methods for securely funding a digital wallet application are provided. The digital wallet application may be run on a source mobile device. Methods may add donated funds to the digital wallet application without linking the donated funds to any one of a plurality of payment instruments associated with the digital wallet application.

Methods may include formulating a link to a webpage that includes a message from a prospective donee requesting funds. The link may be formulated using a secure application. Access to the webpage may be restricted. For example, the donee may specify excluded devices that will be denied access to the webpage. Methods may include ascertaining an identity of a device that attempts to access the webpage. Methods may include generated alerts when an excluded device attempts to access the webpage.

Methods may include formulating a message requesting funds using a secure application. An exemplary secure application may include an online banking application. The secure application may lock the message. Locking the message may include preventing the message from being transmitted to an excluded mobile device. The secure application may be used to circulate the message to destination devices. Each destination device may be running an instance of the secure application.

Methods may include transmitting the message one or more destination mobile devices. In response to the message, methods may include receiving a donated amount from the destination mobile device. Methods may include reformulating the donated amount as an input to the digital wallet application. Methods may include detecting when the source mobile device is within a predetermined distance of a POS terminal at a target merchant. The location of the source device may be detected using one or more sensors of the source mobile device. Such sensors may include location sensors such as a GPS sensor or signal triangulation.

Based on the determined location, methods may include prompting for authentication to use the donated amount for a purchase at the target merchant. In response to the detected location, a POS terminal at the target merchant may be dynamically configured to perform the prompting. The POS terminal may be dynamically configured by the secure application. The POS terminal may be dynamically configured by a remote system that receives a signal from the secure application. The signal may include the location of the source device at the target merchant.

Before disbursing donated funds, authentication may be requested from an intermediary computer system. Authentication may be requested from the source device. For example, the prompting may include requesting the donee submit a biometric feature via the source device to access the donated amount.

In response to successful authentication, methods may include selecting at least one of the plurality of payment instruments associated with the digital wallet to pay for a purchase at the target merchant. In response to the selecting, methods may include funding the purchase using the selected payment instrument and at least a percentage of the donated amount. The percentage of the donated amount applied to the purchase may not be included in a billing statement issued in connection with the selected payment instrument.

A separate billing statement may be issued in connection with the donated amount. The separate billing statement may be provided to donee via the source device. The separate billing statement may be provided to donors that contributed to the donated amount via destination devices. The separate billing statement may not be provided to the excluded device.

Methods may include identifying target products included in a purchase at the target merchant. Methods may include determining a purchase amount corresponding to the target products. Methods may include restricting use of the donated amount to pay for the target products.

For example, the donated amount may be earmarked by donors for use in connection with grocery or child care related costs. A purchase at a target merchant may include grocery and child care items along with other items, such as clothing and other household items. The donated amount may be applied to offset the purchase cost of the grocery and child care items. The donated amount may not be used to pay for the other items included in the purchase. The remainder of the purchase amount may be debited from funds or credit typically associated with a selected payment instrument.

Methods may include detecting an attempt by the destination mobile device to forward the request to an excluded mobile device. In response to detecting the attempt, methods may include deleting the message requesting funds from the destination mobile device. Methods may include refunding any contribution to the donated amount received via destination mobile device that attempted to forward the requesting message.

Methods may include funding a first amount of the purchase using personal funds of the donee. Methods may include funding a second amount of the purchase using funds associated with the donated amount. The first amount and the second amount may collectively add up to a total amount of the purchase.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes mobile devices 101, 103, 105, 107 and 109. The mobile devices are configured to communicate with communication network 113. Each mobile device may communicate with any other connected mobile device via communication network 113.

System 100 shows the mobile devices communicating wirelessly. In other embodiments, one or more of mobile devices 101, 103, 105, 107 and 109 may access communication network 113 using a wired connection.

Illustrative mobile devices may include personal computers, tablets, mobile phones and/or other personal digital assistants ("PDAs") and the like. Typically, if one mobile device transmits a message to another mobile device, that message may be freely forwarded to any other connected mobile device.

Figure 2:
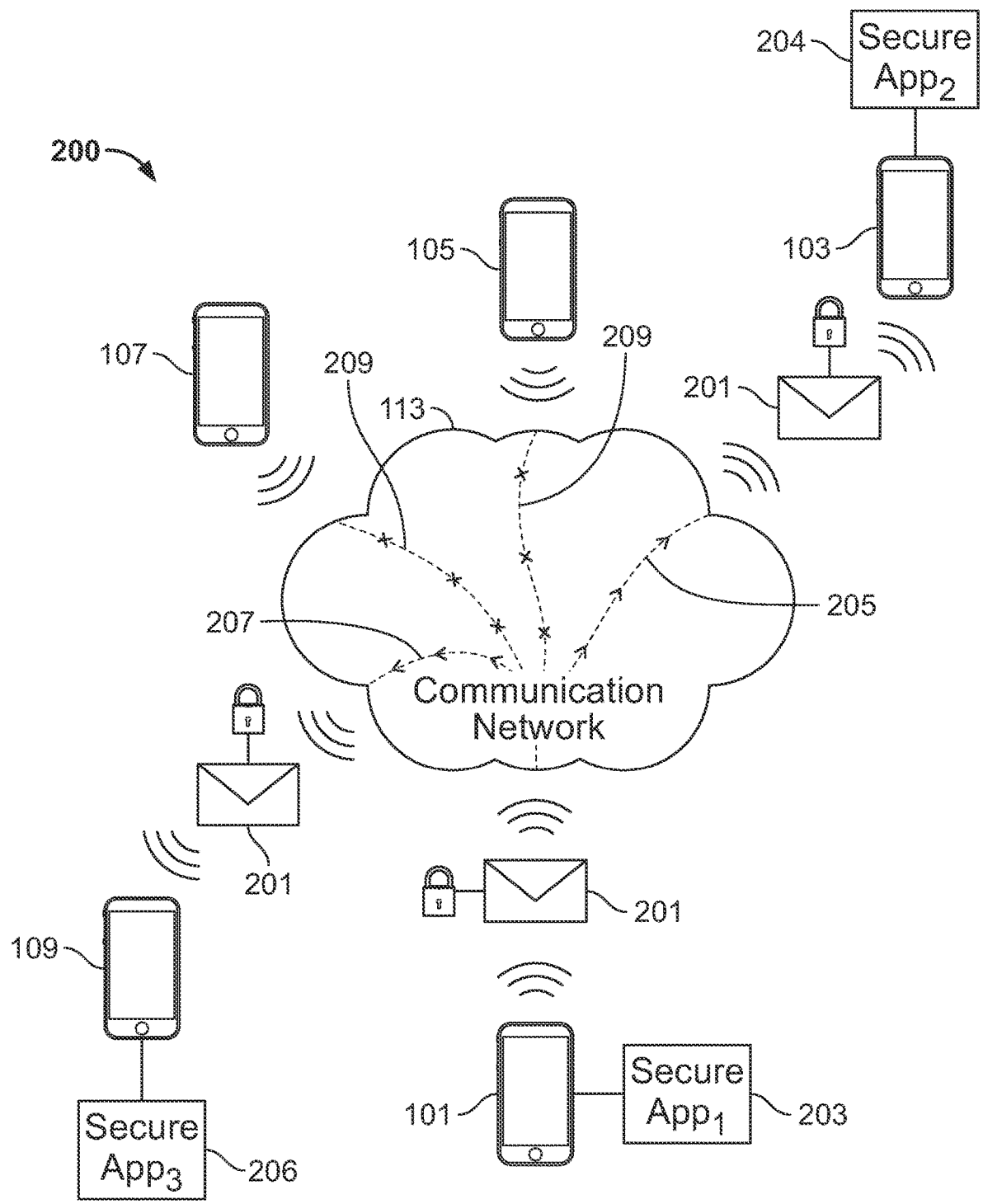
FIG. 2 shows an illustrative system and scenario in accordance with principles of the disclosure.

FIG. 2 shows scenario 200. In scenario 200, mobile device 101 is running instance 203 of a secure application. The Secure application may be configured to formulate secure message 201. The secure application may prevent secure message 201 from being forwarded to any mobile device other than an intended recipient designated by mobile device 101.

Scenario 200 shows that mobile device 101 transmits secure message 201 via communication network 113 to destination mobile devices 103 and 109. Scenario 200 shows that secure message 201 is successfully transmitted by communication network 113 to mobile device 103 using communication pathway 205. Mobile device 103 may view secure message 201 using instance 204 of the secure application. The secure application may prevent mobile device 103 from copying or capturing a screen shot of secure message 201.

Scenario 200 shows that secure message 201 is successfully transmitted by network 113 to mobile device 109 using communication pathway 207. Mobile device 109 may view secure message 201 using instance 206 of the secure application. The secure application may prevent mobile device 109 from copying or capturing a screen shot of secure message 201.

Scenario 200 also shows (e.g., 209) that the secure application prevents any connected mobile device (other than devices 103 and 109) from receiving secure message 201. The secure application may also prevent secure message 201 from being forwarded by mobile device 103 to any other device connected to any other communication network.

The secure application may be configured to verify identification information associated with a destination device designated by mobile device 101. Such identifying information may include a user name, email address, mobile phone number, MAC address, IMEI and/or MEID associated with a destination mobile device. When mobile device 103 or 109 attempts to forward secure message 201, the secure application may be configured to compare an intended recipient address with the identification information designated by mobile device 101.

If the intended recipient has not been designated by mobile device 101, the attempted forwarding by mobile device 103 or 109 may fail. In response to detecting a non-designated intended recipient, the secure application may substitute a known-safe address in the forwarded message. The forwarded message may be transmitted to the known-safe address.

For example, if destination mobile device 109 attempts to forward secure message 201 to mobile device 107, the secure application may cause secure message 201 to be transmitted back to mobile device 101. The secure application may trigger an alert indicating that mobile device 109 attempted to transmit the secure message to excluded mobile device 107. In some embodiments, the know-safe address may be associated with a financial institution that administers the secure application or donated funds.

The secure application may alert mobile device 109 that an unauthorized forwarding of secure message 201 has been attempted. The secure application may alert mobile device 109 that the attempted retransmission has failed. The secure application may alert mobile device 109 that the secure message cannot be forwarded to mobile device 107.

Figure 3:
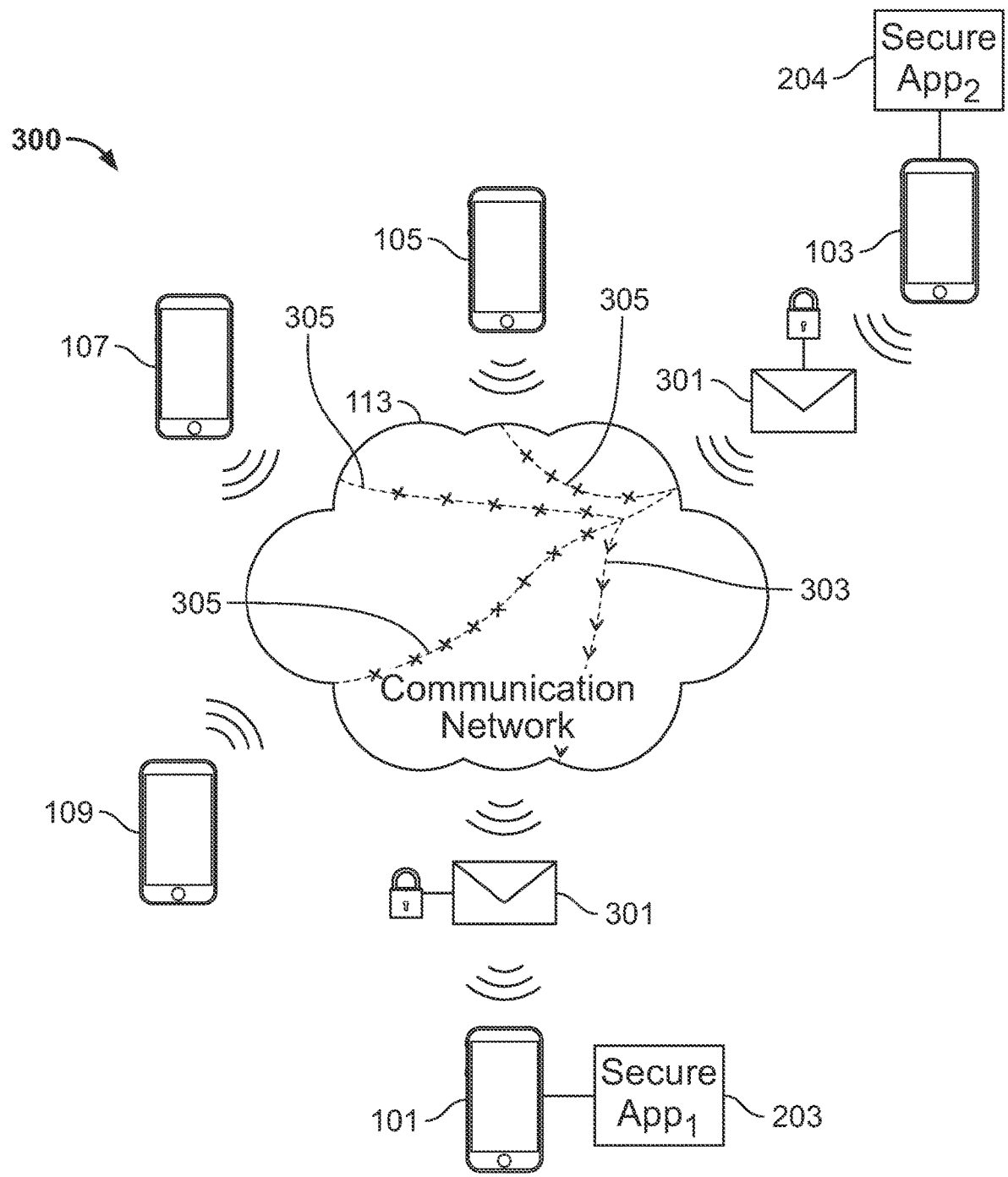
FIG. 3 shows an illustrative system and scenario in accordance with principles of the disclosure.

FIG. 3 shows illustrative scenario 300. Scenario 300 shows that mobile device 103 is transmitting secure message 301 via communication pathway 303 in response to secure message 201 (shown in FIG. 2) received from mobile device 101.

For example, secure message 201 may include a request for financial assistance received from mobile device 101. Mobile devices 101 and 103 may be possessed by users that are part of a virtual group of friends in communication with each other. The user of mobile device 101 may have previously shared information with the user (e.g., a donee) of mobile device 103 that provides context for a financial assistance request.

In response to receiving secure message 201 that includes a request for financial assistance, mobile device 103 may respond with secure message 301. Secure message 301 may include a donation amount. Scenario 300 shows (e.g., 305) that instance 204 of the secure application may prevent secure message 301 from being forwarded to any mobile device other than mobile device 101. In some embodiments, instance 204 may impose the same transmission restrictions as those imposed on secure message 201.

Secure message 301 may authorize a donation of funds or credit to mobile device 101. Secure message 301 may include use-based restrictions on how the donated funds or credit may be spent. For example, restrictions may include requiring biometric authentication by a user of mobile device 101 before spending the donated funds or credit. The restrictions may include requiring use of the funds/credit at a target merchant or within a predetermined geographic location. The restrictions may specify products or a category of products that may be purchased using the donated funds/credit.

Secure message 301, when received by mobile device 101, may trigger creation of a payment option in a digital wallet application running on mobile device 101. Mobile device 101 may access the payment option to spend donated funds/credit.

Figure 4:
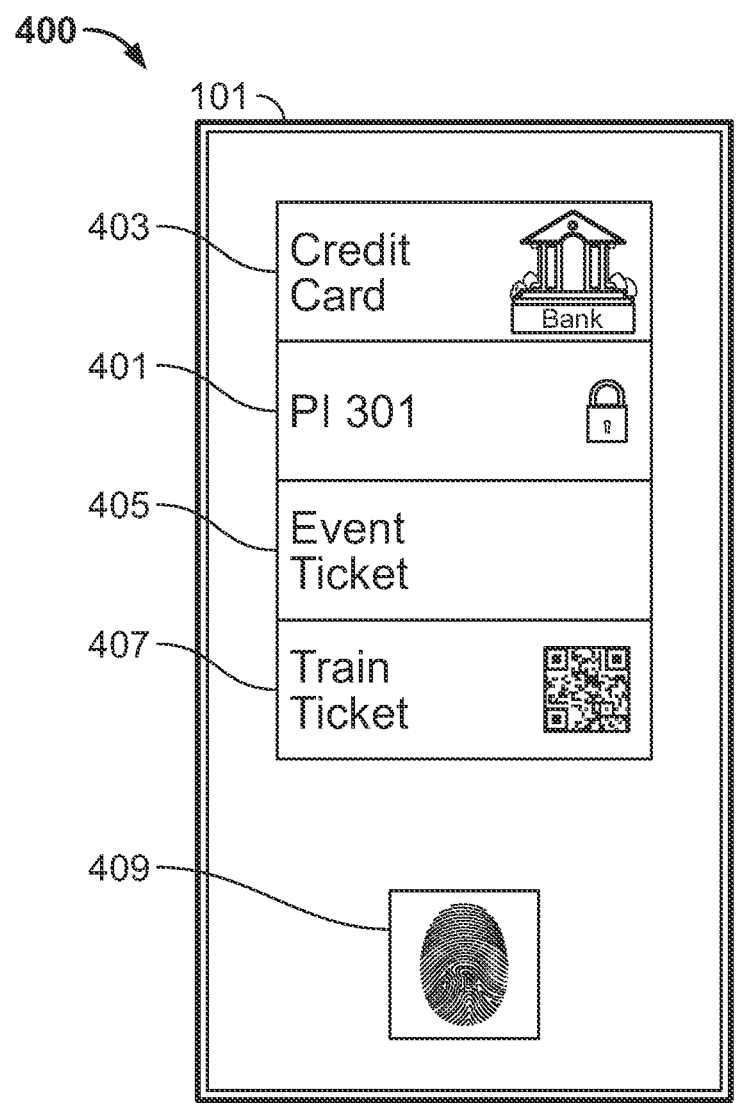
FIG. 4 shows illustrative apparatus in accordance with principles of the disclosure.

FIG. 4 shows illustrative operation screenshot 400 of mobile device 101. Screenshot shows a digital wallet application running on mobile device 101. The digital wallet application includes virtual credit card 403. Virtual credit card 403 may correspond to a personal credit card of the user of mobile device 101. The digital wallet application includes virtual event ticket 405 and virtual train ticket 407.

The digital wallet application also includes secure payment option 401. Secure payment option 401 may be added to the digital wallet application in response to receiving secure message 301 (shown in FIG. 3). Secure payment option 401 may require authentication of biometric feature 409 to access funds/credit associated with secure payment option 401.

Funds/credit associated with secure payment option 401 may be donated by mobile device 103 or any other recipient of secure message 201 (shown in FIG. 2). Secure payment option 401 may not provide access to all funds/credit donated in response to secure message 201.

For example, in response to receiving secure message 201, mobile devices 103 and 109 may donate funds/credit. A financial institution may hold the funds/credit for disbursement via payment option 401. Payment option 401 may be loaded with an initial amount of funds/credit that is less than the total amount collectively donated by mobile devices 103 and 109. After payment option 401 is used to spend the initial amount of funds/credits (in accordance with any restrictions in force), the financial institution may replenish secure payment option 401 with additional funds/credit.

Figure 5:
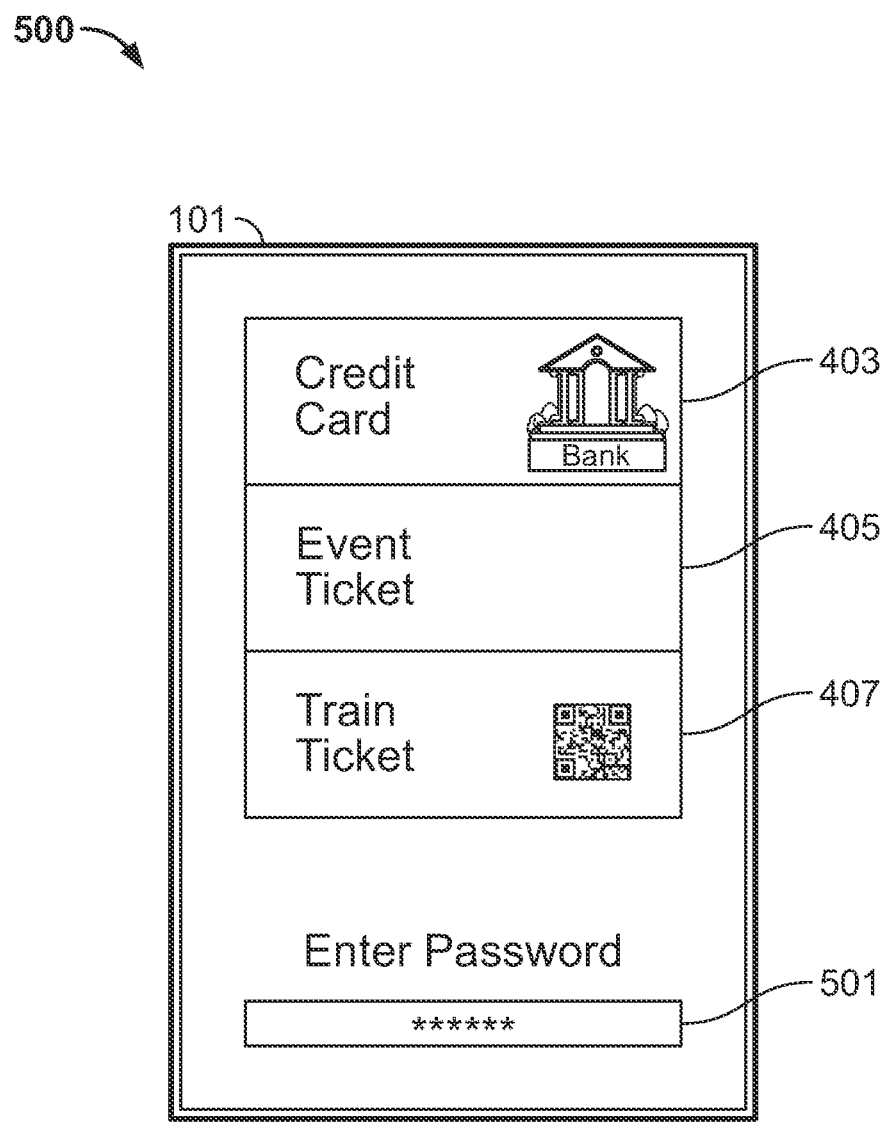
FIG. 5 shows illustrative apparatus in accordance with principles of the disclosure.

FIG. 5 shows illustrative screenshot 500 of mobile device 101. Screenshot 500 shows that password 501 has been entered to access a digital wallet application running on mobile device 101. Screenshot 500 shows that because password 501 has been entered (instead of providing biometric feature 409), payment option 401 (shown in FIG. 4) is not visible within the digital wallet application.

In some embodiments, secure payment option 401 may be hidden when a biometric feature is presented and displayed when a password is entered. Hiding secure payment option 401 in certain circumstances may prevent unauthorized use and viewing of funds/credit associated with secure payment option 401 by others that may share use of mobile device 101.

Figure 6:
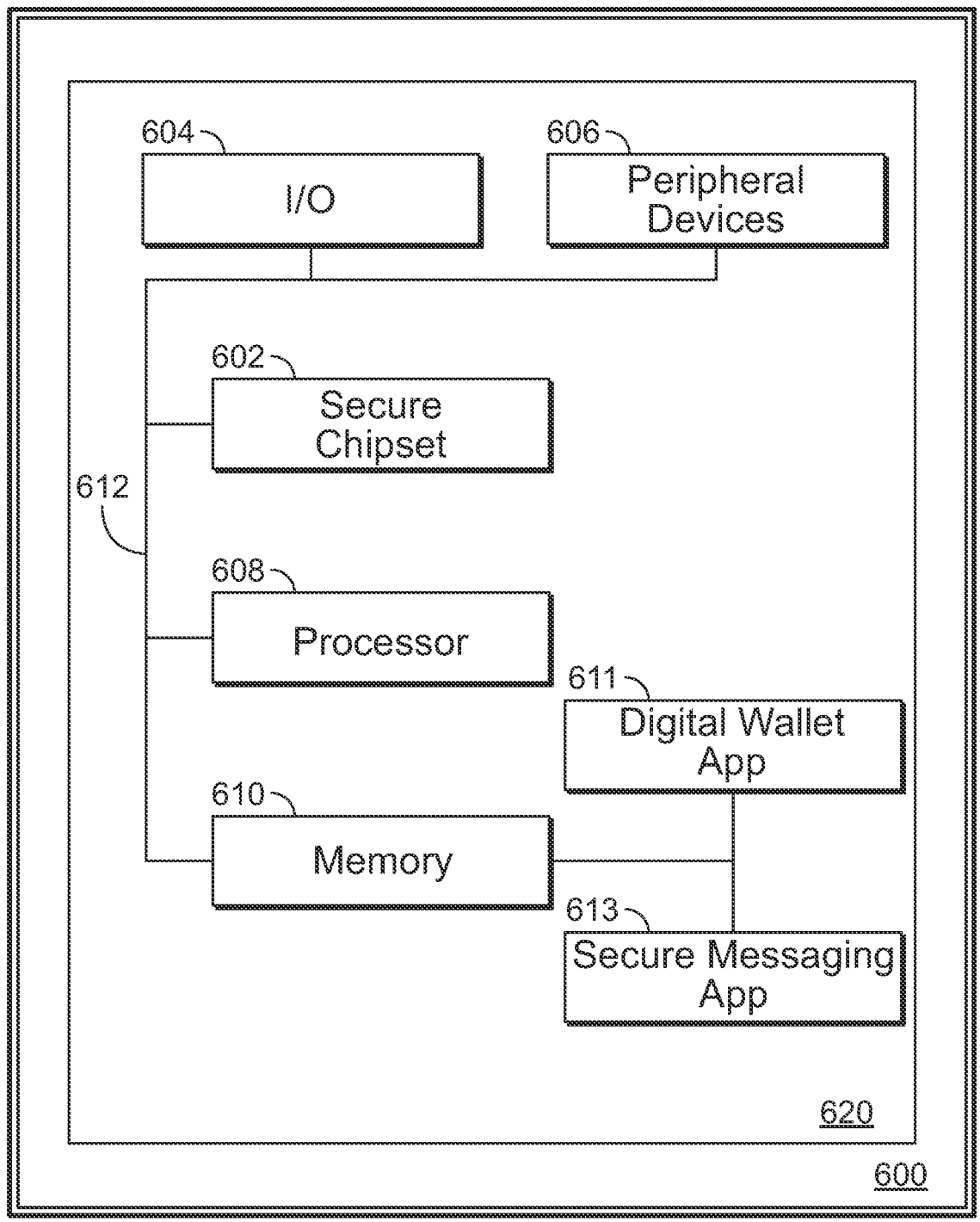
FIG. 6 shows illustrative apparatus in accordance with principles of the disclosure.

FIG. 6 shows illustrative hardware 600 that may be included in mobile device 101. Hardware 600 may include one or more integrated circuits which may be configured to perform any suitable logical operation.

Hardware 600 includes secure chipset 602. Secure chipset 602 may be an isolated chip on a mobile device that has limited interaction with the rest of a mobile device's operating system. For example, the secure chipset 602 may be isolated because it is only accessible when the mobile device is within communication range of a merchant POS terminal. The secure chipset 602 may only be accessed by the merchant POS terminal and not by the operating system running on the mobile device.

Secure chipset 602 may store information needed to process a purchase transaction. Secure chipset 602 may store secure messages or identifiers of destination or excluded devices. Secure chipset 602 may store series of randomly generated numbers (e.g., a "token") that correspond to credit card 403 stored in a digital wallet application (shown in FIG. 4). The token may be transmitted to a merchant POS terminal at a time of sale and forwarded to an issuer associated with the credit card. The issuer may hold a key needed to decipher the token and correlate the randomly generated numbers to a specific user account. The issuer may provide the merchant POS terminal with an authorization decision that either approves or denies the purchase transaction initiated using the token. The token may be dynamically changed with each transaction so that a token is only usable for a single transaction.

Hardware 600 includes I/O circuitry 604, which may include a transmitter device and a receiver device and may interface with fiber optic cable, coaxial cable, telephone lines, wireless devices, PHY layer hardware, a keypad/display control device or any other suitable encoded media or devices. I/O circuitry may include a near-field communication chip for wireless communication with a merchant POS terminal.

Hardware 600 includes peripheral devices 606, which may include counter timers, real-time timers, power-on reset generators or any other suitable peripheral devices. Hardware 600 includes logical processing device 608, which may compute data structural information, structural parameters of the data, quantify indices.

Hardware 600 includes machine-readable memory 610. Memory 610 may be configured to store, in machine-readable data structures: secure messages, tokens, sensitive data, electronic signatures of biometric features or any other suitable information or data structures. Memory 610 may be configured to store code associated with application programs such as a secure messaging application and digital wallet application.

Memory 610 may store software used by a mobile device, such as an operating system, application programs, web browser and a database. Application programs may include digital wallet application 611 and secure messaging application 613.

Components of hardware 600 may be coupled together by a system bus or other interconnections 612 and may be present on one or more circuit boards such as circuit board 620. In some embodiments, the components may be integrated into a single chip. The chip may be silicon-based.

Figure 7:
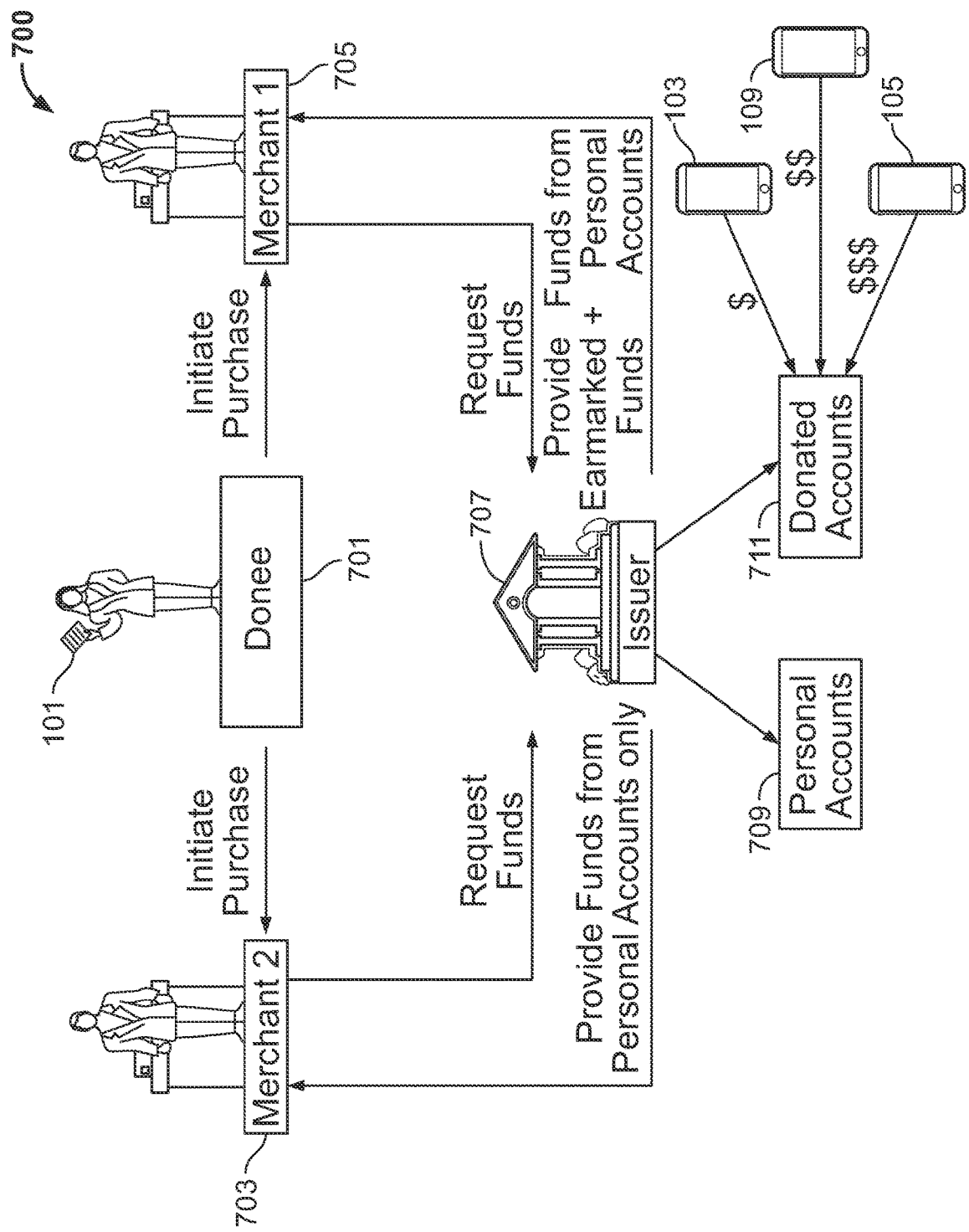
FIG. 7 shows an illustrative system and process in accordance with principles of the disclosure.

FIG. 7 shows illustrative process 700. One or more of the steps of the process illustrated in FIG. 7 may be performed by a "system." The "system" may include one or more of the features of the apparatus shown in FIGS. 1-6 and/or any other suitable device or approach. The "system" may be provided by an entity. The entity may be an individual, an organization or any other suitable entity.

In process 700, donee 701 may use mobile device 101 to initiate a purchase at merchant 705. Donee 701 may initiate the purchase by using a digital wallet application to transmit information associated with a payment option to a POS terminal of merchant 705. The information presented by donee 701 may include information associated with payment option 401 (shown in FIG. 4).

In response to receiving the information associated with the payment option, merchant 705 may submit the information to issuer 707 for authorization. Issuer 707 may recognize that the received information is associated with payment option 401. Issuer 707 may enforce restrictions associated with payment option 401. For example, issuer 401 may authorize the purchase transaction based on a combination of funds available in personal account 709 of customer 101 and donated funds 711. Donated funds 711 may have been provided by donors via mobile devices 103, 109 and 105 in response to secure message 201 (shown in FIG. 2) received from donee 701.

In some embodiments, based on a location or MCC associated with merchant 705, issuer 707 may authorize the purchase transaction exclusively based on donated funds 711. In some embodiments, when issuer 707 determines that donated funds 711 are linked to personal account 709, issuer 707 may authorize the purchase transaction despite prior activity associated with personal account 709 that would have typically triggered a transaction denial.

Process 700 also shows that donee 101 may initiate a purchase transaction with merchant 703. Donee 701 may submit information associated with payment option 401 to fund the purchase transaction. Issuer 707 may receive an authorization request from merchant 703 that includes the information associated with payment option 401.

Based on an identity of items desired to be purchased, a location or MCC associated with merchant 705, issuer 707 may authorize the purchase transaction exclusively based on personal account 709. However, when issuer 707 determines that donated funds 711 are linked to personal account 709, issuer 707 may authorize the purchase transaction despite prior activity associated with personal account 709 that would have typically triggered a denial.

In some embodiments, issuer 707 may authorize the purchase transaction despite prior activity associated with personal account 709 that would have typically triggered a denial based on analysis of data provided by third party applications. For example, a donee may authorize access to third party applications. Analysis of data shared by the donee using third party applications may confirm a situational need of the donee. The analysis of data shared by the done using third party application may include sentiment analysis.

Thus, apparatus and methods for SYSTEM FOR SECURE DISTRIBUTION OF PEER REQUESTS FOR RESOURCES are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A computer and digital processing system for securing information routed between mobile devices on a network, the system comprising:
   a source mobile device configured to transmit and receive data on the network;
   a destination mobile device configured to transmit and receive data on the network;
   an excluded mobile device configured to transmit and receive data on the network; and
   a secure application configured to:
      formulate a message at the source mobile device;
      embed at least one identifier associated with the excluded mobile device in the message and thereby lock the message such that when the message is viewed on the destination mobile device, the message cannot be transmitted to the excluded mobile device;
      corroborate the message using sentiment analysis;
      transmit the message over the network to the destination mobile device;
      disable the destination mobile device from copying the message when the message is displayed on the destination mobile device by:
         hiding display of a cursor when the locked message is being viewed on the destination mobile device; and
         disabling a capability of the destination mobile device to capture a screenshot of the message;
      prompt the destination mobile device to formulate a response to the message;
      embed at least one identifier associated with the excluded mobile device in the response and thereby lock the response such that the response cannot be transmitted to the excluded mobile device; and
      route the response over the network to an intermediary computer system;
         in response to receiving the response from the destination mobile device, the intermediary computer system is configured to:
            add funds to a payment option associated with a digital wallet application running on the source mobile device; and
            reformulate the response as an input to the digital wallet application running on the source mobile device; and
         the secure application is configured to:
            receive the input from the intermediary computer system;
            hide the input from being displayed in the digital wallet application running on the source mobile device when:
               the source mobile device is within a predetermined distance of the excluded mobile device; or
               the source mobile device is unlocked using a password;
            display the input in the digital wallet application running on the source mobile device when the source mobile device is unlocked using a biometric feature;
            migrate the input into the digital wallet application running on the source mobile device to populate the digital wallet application running on the source mobile device with the payment option;
            when the source mobile device is unlocked using the biometric feature within a predetermined distance of a point-of-sale ("POS") terminal at a target merchant:
               prompt for selection of at least one of a plurality of payment instruments to pay for a purchase at the target merchant; and
               in response to the selection, paying for the purchase using the selected payment instrument and the payment option.

2. The computer and digital processing system of claim 1, wherein the secure application is further configured to:
   identify a target product included in the purchase; and
   restrict use of the payment option to the target product.

3. The computer and digital processing system of claim 1, wherein the secure application is further configured to:
   detect an attempt by the destination mobile device to forward the message to the excluded mobile device; and
   in response to the attempt deleting the message from the destination mobile device.

4. The computer and digital processing system of claim 1, wherein the response from the destination mobile device comprises an authorization to transfer the funds from an account associated with the destination mobile device to the source mobile device.

5. The computer and digital processing system of claim 4, wherein the secure application is further configured to:
   detect an attempt by the destination mobile device to forward the message to the excluded mobile device; and in response to the attempt transferring the funds from the payment option associated with the digital wallet application running on the source mobile device to the account associated with the destination mobile device.

6. The computer and digital processing system of claim 4, the secure application is further configured to:
- pay for a first amount of the purchase using the selected payment instrument; and
- pay for a second amount of the purchase using the payment option;
- wherein, the first amount and the second amount comprise a total amount of the purchase.

7. The computer and digital processing system of claim 1 wherein the secure application is configured to delete the message from the destination mobile device after a predetermined time period.

8. The computer and digital processing system of claim 7 wherein the secure application is configured to retransmit the message to the destination mobile device when a response is not received from the destination mobile device after expiration of the predetermined time period.

9. The computer and digital processing system of claim 1 wherein the funds are first funds, the intermediary computer system is further configured to:
- receive second funds from the destination mobile device; and
- when the first funds associated with the payment option falls below a threshold amount, replenish the first funds using the second funds.

10. The computer and digital processing system of claim 1 wherein:
- the digital wallet application is operational with a plurality of payment options; and
- in response to receiving the funds, the intermediary computer system is configured to associate the funds with at least one of the plurality of payment options.

* * * * *